(12) United States Patent
Radermacher et al.

(10) Patent No.: US 7,043,934 B2
(45) Date of Patent: May 16, 2006

(54) DEVICE FOR COLLECTING WATER FROM AIR

(75) Inventors: Reinhard K. Radermacher, Silver Spring, MD (US); Hisham Fawzi, Leesburg, VA (US)

(73) Assignee: University of Maryland, College Park, College Park, MD (US)

( * ) Notice: Subject to any disclaimer, the term of this patent is extended or adjusted under 35 U.S.C. 154(b) by 36 days.

(21) Appl. No.: 10/771,624

(22) Filed: Feb. 5, 2004

(65) Prior Publication Data

US 2004/0244398 A1  Dec. 9, 2004

Related U.S. Application Data

(63) Continuation-in-part of application No. 10/275,061, filed as application No. PCT/US00/11716 on May 1, 2000.
(60) Provisional application No. 60/445,159, filed on Feb. 5, 2003.

(51) Int. Cl.
 *F25D 21/14* (2006.01)

(52) U.S. Cl. .............................. 62/285; 62/93; 62/95; 62/272

(58) Field of Classification Search .............. 62/92, 62/93, 95, 150, 272, 285, 291
See application file for complete search history.

(56) References Cited

U.S. PATENT DOCUMENTS

| 2,682,758 | A | 6/1954 | Harris |
| 3,675,442 | A | 7/1972 | Swanson |
| 4,428,205 | A | 1/1984 | Doderer |
| 4,738,120 | A | 4/1988 | Lin |
| 4,841,733 | A | 6/1989 | Dussault et al. |
| 5,006,138 | A | 4/1991 | Hewitt |
| 5,259,203 | A | 11/1993 | Engel et al. |
| 5,309,725 | A | * 5/1994 | Cayce ............................ 62/90 |
| 5,634,353 | A | 6/1997 | Hallin et al. |
| 5,669,221 | A | 9/1997 | LeBleu et al. |
| 5,701,749 | A | 12/1997 | Zakryk |
| 5,729,981 | A | 3/1998 | Markus et al. |
| 5,732,562 | A | 3/1998 | Moratalla |
| 5,758,509 | A | * 6/1998 | Maeda .......................... 62/94 |
| 5,845,505 | A | 12/1998 | Galus et al. |
| 5,873,256 | A | 2/1999 | Denniston |
| 5,918,472 | A | * 7/1999 | Jonqueres ...................... 62/87 |

* cited by examiner

*Primary Examiner*—Melvin Jones
(74) *Attorney, Agent, or Firm*—Sterne, Kessler, Goldstein & Fox P.L.L.C.

(57) ABSTRACT

The present invention is directed to a water making device that collects the moisture contained in the atmosphere and condenses it into high purity water. In one embodiment, moist air entering the water making/water cooling system flows across an air filter, then a precooler heat exchanger (where the air stream is cooled to or close to its dew point) and then a water extraction heat exchanger, where the air stream is cooled further and water is extracted. The water that leaves water extraction heat exchanger is collected in a water collection device and passes from there through a primary water filter into a water storage tank. The air stream then passes across a reheat heat exchanger and exhausted to the outside. A water circulation pump extracts water from the water storage tank and circulates the water stream through an evaporator of a vapor compression refrigeration system, where the water stream is chilled, then through the water extraction heat exchanger and precooler, where the incoming air stream is chilled by removing heat to the water stream. The water stream is then circulated through the reheat heat exchanger, where the water stream is again cooled by removing heat to the cool dry air exiting the water extraction heat exchanger. Finally, the cooled water stream is circulated through the water filter to a three way valve, that directs water flow either to a dispenser or back to the water storage tank.

1 Claim, 11 Drawing Sheets

DEVICE FOR COLLECTING WATER FROM AIR

CROSS-REFERENCE TO RELATED APPLICATIONS

This application is a continuation-in-part of U.S. application Ser. No. 10/275,061, filed Nov. 1, 2002, which is a U.S. National Phase Application under 35 U.S.C. § 371 of International Application PCT/US00/11716, filed May 1, 2000. This application also claims the benefit of U.S. Provisional Application No. 60/445,159, filed Feb. 5, 2003, both of which are incorporated herein by reference.

BACKGROUND OF THE INVENTION

1. Field of the Invention

The present invention is directed to a device for collecting water from air and more particularly, to a device for collecting the moisture contained in the atmosphere and condensing it into water of high purity.

2. Related Art

Several devices have been previously described for making water from moisture in the atmosphere. For the sake of simplicity, these devices are termed herein "water-makers." Typically, these systems are based on a refrigeration device operating according to the vapor compression refrigeration cycle. They are known from other applications as dehumidifiers. In the vapor compression refrigeration cycle, a refrigerant is circulated through a closed circuit cycle of condensation and evaporation to produce a cooling effect. Cooling is accomplished by the evaporation of the liquid refrigerant at low pressure. The refrigerant first enters a compressor, where the temperature of the refrigerant is elevated by mechanical compression, turning the refrigerant into a superheated, high pressure vapor. The high pressure vapor enters a condenser, where the vapor condenses to a liquid and the resultant heat is dissipated to the surroundings. The resultant high pressure liquid then passes through an expansion valve through which the fluid pressure and temperature are lowered. Finally, the low-pressure fluid enters the evaporator, where it evaporates by absorbing heat from the cooled space. The resultant vapor then reenters the compressor and the cycle is repeated. As air flows across the evaporator, it is cooled below its dew point. Thus, water, in the form of condensation, is obtained as a byproduct of the vapor compression refrigeration cycle. A condensed water collection device is disposed below the evaporator to collect water than condenses as air flows over the evaporator.

Often, these water-makers are also equipped with various devices for water storage and for maintaining and controlling water purity, such as UV lights and filters. Conventional water supply devices, such as water fountains and dispensers for spring water, are designed to provide water that is either cooled or heated for the convenience of the user.

The prior water-makers all have in common that the preferred operating mode requires air of high moisture content which is readily available in high temperature/high humidity climates. For most devices, the operating range begins at 65° F. and 50% relative humidity and ranges to higher temperatures. If the temperature drops below 65° F., the evaporator coil will show frost accumulation and eventually be covered by a solid block of ice. Under low temperature conditions, the water production rate is very low or zero and the power consumption is very high. The effectiveness of the system, expressed in liters of water per kWh of electricity consumed is very low or zero and accordingly the operating cost unacceptably high.

The inefficiency of the conventional systems results from the fact that for each pound of water produced, a large amount of air has to be cooled below the dew point. The colder the air temperature, the lower the water content and the lower the dew point. Consequently, more air has to be cooled before any moisture is condensed. This leads to very large evaporator capacities that do not contribute to the production of water per se.

However, once a user has a water-maker in operation, he will expect water production even under colder and dryer conditions. Thus, there is a need for a more reliable device, the water production capability of which is not so sensitive to weather and environmental conditions. This is especially important for applications in deserts, military uses and the like, where no other back-up water source may be available.

SUMMARY OF THE INVENTION

The present invention solves the need in the art by providing a more reliable water making device, wherein the water production capability is not so sensitive to weather and environmental conditions. In particular, the present invention is directed to a device for collecting water from air particularly well suited for dry, low air temperature environments.

In one embodiment of the present invention, moist air entering the system flows first through a precooler and then passes across an evaporator that cools the air below the dew point and produces water. The dry, cold air that leaves the evaporator flows back through the precooler, such that the dry, cold air is used to precool the incoming moist air. The precooler can be an air-to-air heat exchanger and may consist of a design that includes a heat pipe, a thermosyphon, a heat exchange wheel or similar devices known to those skilled in the art. A refrigerant is circulated between the evaporator and a condenser through a closed circuit cycle of condensation and evaporation to produce the cooling effect. The refrigeration device can operate according to either the vapor compression refrigeration cycle, through the use of a mechanical compressor, or the absorption refrigeration cycle, incorporating a heat source, absorption generator and a secondary fluid or absorbent. In one embodiment of the invention, two fans are used, one to move air across the evaporator and the other to move air across the condenser. Alternatively, a single fan arrangement can be used, in which a single fan simultaneously moves air across both the evaporator and the condenser.

In a second embodiment of the present invention, an integrated water maker/water cooler system is disclosed in which two evaporators are employed. The first evaporator serves the same function as described above, to remove the moisture from the air, while the second evaporator is submerged inside a water storage tank or mounted in a heat transfer relationship with the water tank, for cooling the water collected in the tank. The refrigerant flow for both evaporators is controlled by a thermostatic expansion valve that maintains constant refrigerant superheat at the outlet of the second evaporator. A control system for controlling the compressor, evaporator fan and expansion valve may be employed, such that the control system turns on the compressor and the evaporator fan in response to a signal indicating that water making is required and the control system turns on the compressor and turns off the evaporator fan in response to a signal indicating that water making is not required but water cooling is required. Additionally, the control system can adjust the expansion valve based on the superheat downstream of the second evaporator.

In a third embodiment, relatively dry, cold air flowing through a first air duct is passed across a desiccant wheel, which absorbs moisture in the air stream. The wheel is then rotated into a regeneration zone of a second air duct where it is exposed to hot air of very small flow rate for regeneration. The heat supplied by the air to the wheel is just sufficient enough to heat the wheel to a temperature level of about 90° C., so that all absorbed water is released into the air stream. In this manner, the moisture content of the hot regeneration air stream is much higher than that of the original air stream and the dew point of the regeneration air stream is also increased considerably. The regeneration air stream is then passed across an air-to-air heat exchanger, such that the regeneration air stream is cooled below its dew point and a significant portion of its moisture content is condensed. The desiccant material may be continuously rotatable, such that there is always some desiccant material in the first air duct and there is always some desiccant material in the second air duct. In order to extract as much moisture as possible from the regeneration air stream, a vapor compression system may be added and operated in the same manner as described above. In certain applications, when the system has to be operated independent of any supply of electricity, the vapor compression system can be operated using an internal combustion engine or any other such power plant (micro turbine, gas turbine, fuel cell, etc.) as the source of power for the compressor, fan(s) and controls. In this case, the waste heat of the engine can be utilized to heat the regeneration air.

In a fourth embodiment of the present invention, a water making/water cooling unit is provided that requires a single water circulation pump which serves multiple purposes. Moist air entering the water making/water cooling system flows across an air filter. The air stream then continues across a precooler heat exchanger, where the air stream is cooled to or close to its dew point and then passes across a water extraction heat exchanger, where the air stream is cooled further and water is extracted. The air stream then passes across a reheat heat exchanger, where the air is heated again (as the water on the inside of the heat exchanger cooled), and, finally, the air stream is exhausted to the outside. A cold air fan or similar air flow device establishes the air movement. The water that leaves water extraction heat exchanger is collected in a water collection device and passes from there through a primary water filter into a water storage tank. The system is operated through two fluid circulation loops. In the first loop, a refrigerant is circulated between an evaporator and a condenser through a closed circuit cycle of condensation and evaporation to produce a cooling effect. The second fluid circulation loop is a water loop. A water circulation pump extracts water from the water storage tank and circulates the water stream through the evaporator, where the water stream is chilled, then through the water extraction heat exchanger and precooler, where the incoming air stream is chilled by removing heat to the water stream. The water stream is then circulated through the reheat heat exchanger, where the water stream is again cooled by removing heat to the cool dry air exiting the water extraction heat exchanger. The cooled water stream is then circulated through a water filter and/or UV flow through device, to further purify and sterilize the water, and finally to a three way valve, that directs water flow either to a dispenser or back to the water storage tank.

BRIEF DESCRIPTION OF THE DRAWINGS/FIGURES

The foregoing and other features and advantages of the invention will be apparent from the following, more particular description of a preferred embodiment of the invention, as illustrated in the accompanying drawings.

DETAILED DESCRIPTION OF THE INVENTION

The present invention is directed to a device for collecting water from air and more particularly, to a device for collecting the moisture contained in the atmosphere and condensing it into water of high purity. Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
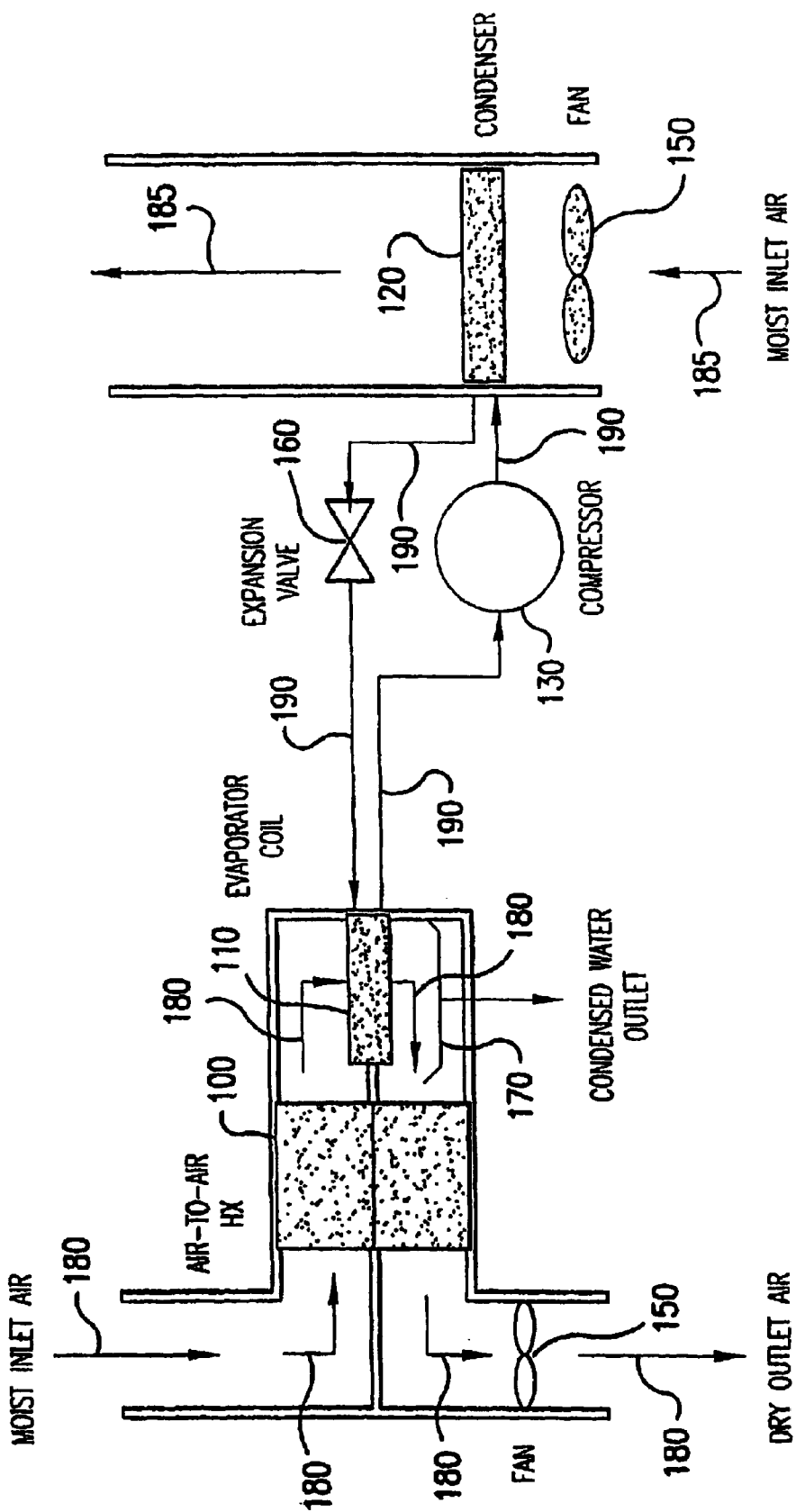
FIG. 1 is a schematic diagram of one embodiment of a water maker according to the present invention.

FIG. 1 shows one embodiment of the present invention. Moist air entering the system flows first through a precooler 100 before it passes across an evaporator 110 that actually cools the air below the dew point and produces water. (Air flow is represented by arrows 180 in FIG. 1.) The dry, cold air that leaves evaporator 110 flows through a second path of precooler 100. In this way, the cold, dry air is used to precool the incoming moist air. Since both air streams have approximately the same specific heat capacity and the same mass flow rate, precooler 100 cools the incoming air stream almost to the dew point when the effectiveness of precooler 100 is chosen in the appropriate range, preferably approximately 0.9 depending on operating and design conditions. Thus the capacity of evaporator 110 can be devoted almost entirely to the production of water, rather than for the cooling of air.

Precooler 100 can be an air-to-air heat exchanger that approaches counter flow as much as possible (although cross flow alone would be helpful, but not as good as counter flow) and may consist of a wide variety of materials, such as copper, aluminum and/or plastic, or a design that includes a heat pipe, a thermo-syphon, a heat exchange wheel or similar devices known in the art for use in air-to-air heat exchange. Another embodiment is the use of a heat exchange wheel. The heat exchange wheel is similar to a desiccant wheel, but the heat exchange wheel only transfers heat, not moisture, from one air stream to the other. The preferred embodiment uses both a heat pipe and a heat exchange wheel.

Evaporator 110, condenser 120 and compressor 130 operate according to the vapor compression refrigeration cycle to form a closed loop refrigeration circuit. As discussed above, in the vapor compression refrigeration cycle, a refrigerant is circulated through a closed circuit cycle of condensation and evaporation to produce a cooling effect. The refrigerant (not shown), for example Freon gas, first enters compressor 130. (Refrigerant flow is shown by arrows 190 in FIG. 1.) The refrigerant temperature is elevated by the mechanical compression performed by compressor 130, such that the refrigerant leaves compressor 130 and enters condenser 120 as a superheated, high pressure vapor. The vapor condenses to a liquid at this pressure within condenser 120 and the resultant heat is dissipated to the cooled surroundings. The refrigerant then leaves condenser 120 as a warm, high-pressure liquid. The pressure and temperature of the liquid refrigerant are decreased as the refrigerant flows through an expansion valve 160 and the resultant cool, low pressure liquid is vaporized in evaporator 110 by absorbing heat from the moist inlet air stream. Cooling is accomplished by the evaporation of the liquid refrigerant at low pressure. The refrigerant, as a cool, low pressure vapor, then enters compressor 130 and the cycle is repeated. A water collection device 170 is disposed below, or otherwise in association with, evaporator 110 to collect the condensed water outlet.

Condenser 120 of the system is cooled with a second air stream dedicated to just this purpose (indicated by arrows 185 in FIG. 1), this is unlike a conventional system, where condenser 120 is cooled with the cold air leaving evaporator 110. As shown in the psychometric diagram of FIG. 2, in the conventional system, the air stream leaving evaporator 110 has to absorb from condenser 120 an amount of heat (symbolized by the length of line 3 to 6) that is composed of two contributions. The first is the heat removed by evaporator 110 (which is the latent and sensible load, line 3 to 5) plus the work input to compressor 130, line 5 to 6. With this requirement, condenser 120 will heat the air stream significantly beyond its original temperature, which would be reached at point 4. Thus the temperature of evaporator 110 must be below T3 and the temperature of condenser 120 above T6. This is a rather large temperature lift, increasing quickly for decreasing air temperatures and moisture content. In the system according to the present invention, on the other hand, the temperature lift can be reduced by using air from the surroundings for cooling of condenser 120. This air flow rate can be chosen as large as necessary to lower the temperature of condenser 120 to a much more efficient operating condition. Preferably two fans 150 are used. Alternatively, a single fan 350 can be used, as shown in FIG. 3 and discussed below.

Figure 2:
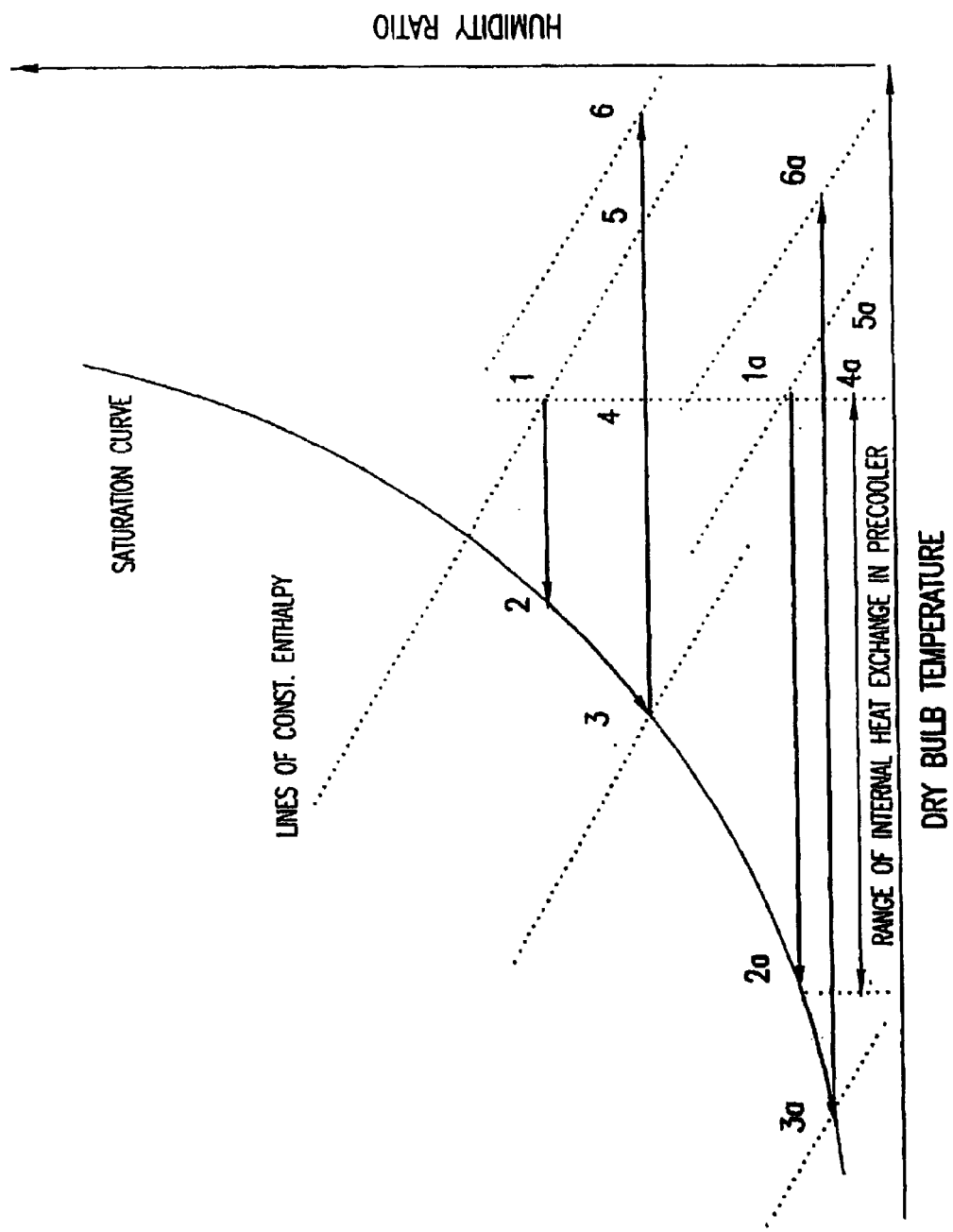
FIG. 2 is a psychometric diagram comparing a conventional water maker to the embodiment of the present invention shown in FIG. 1.

As shown in FIG. 2, under low moisture conditions, the air has to be cooled to very low temperatures such as T3a. However, because of precooler 100, the capacity of evaporator 110 has to take care of only the enthalpy difference from h2a to h3a (line 2a to 3a). Accordingly, heat from condenser 120 is smaller than in the conventional system (line 4a to 6a instead of line 3 to 6) and is rejected under more beneficial conditions as described above. Thus the process according to the present invention increases the energy efficiency of the water-making process.

Figure 3:
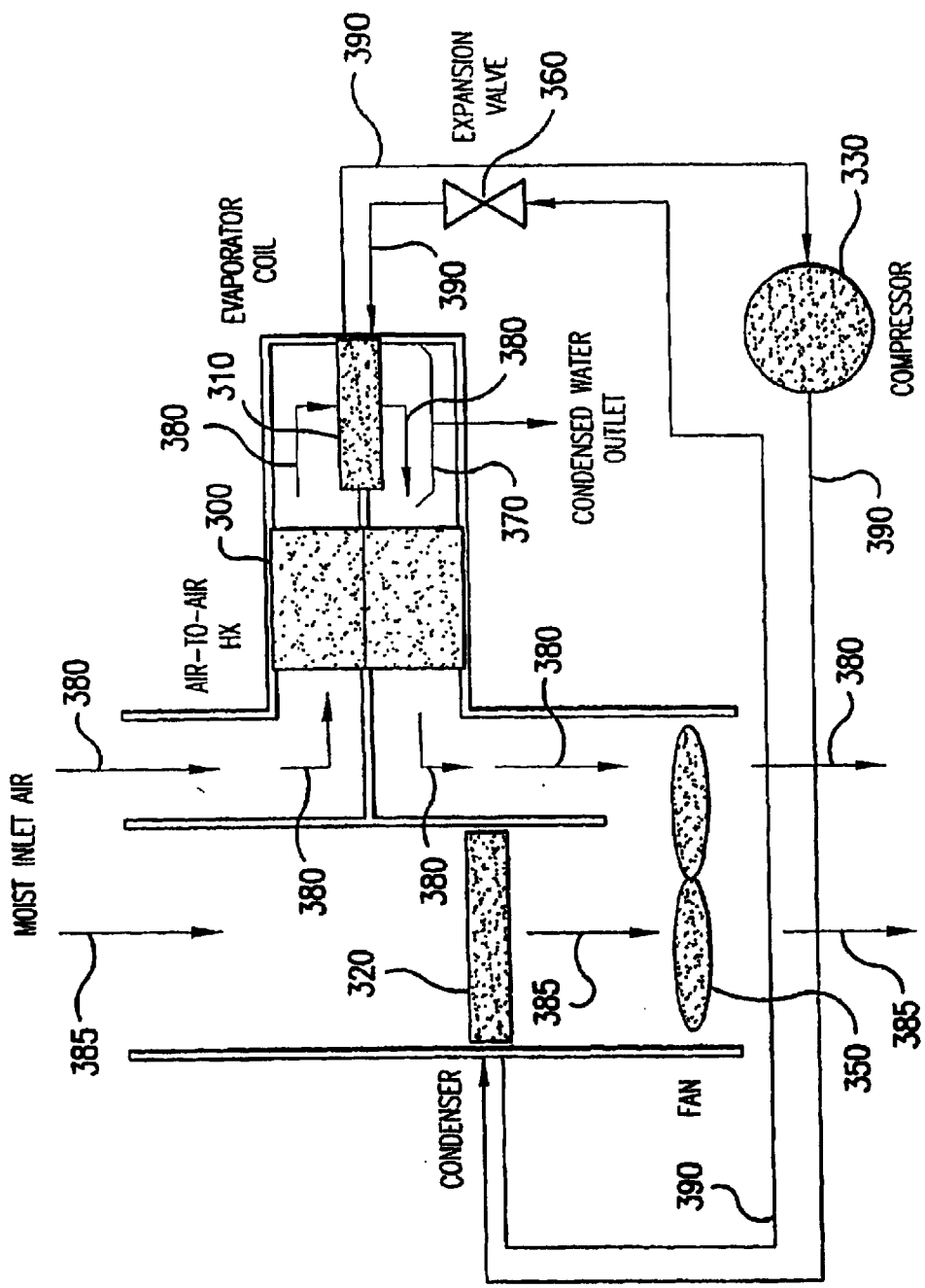
FIG. 3 is a schematic diagram of another embodiment of a water maker according to the present invention.

FIG. 3 shows another embodiment of the present invention that requires only one fan 350 to process both inlet air streams simultaneously. Moist air entering the system flows across both precooler 300 and condenser 320. A portion of the moist inlet air flows first through precooler 300 and then passes across evaporator 310, at which point the air is cooled below the dew point and water is produced. (This portion of the air flow is represented by arrows 380 in FIG. 3.) The dry, cold air that leaves evaporator 310 flows through a second path of precooler 300. In this way, the cold, dry air is used to precool the incoming moist air. The remainder of the moist inlet air is used to cool condenser 320. (This portion of the air flow is represented by arrows 385 in FIG. 3.) The air flow rate can be chosen as large as necessary, depending on the desired operating condition of condenser 320. Preferably, the air flow rate across the condenser should be four to ten times the air flow rate across the evaporator. Fan 350 is utilized to control the air flow rate.

As discussed above, evaporator 310, condenser 320 and compressor 330 operate according to the vapor compression refrigeration cycle to form a closed loop refrigeration circuit. As discussed above, in the vapor compression refrigeration cycle, a refrigerant is circulated through a closed circuit cycle of condensation and evaporation to produce a cooling effect. The refrigerant, for example Freon gas, first enters compressor 330. (Refrigerant flow is shown by arrows 390 in FIG. 3.) The refrigerant temperature is elevated by the mechanical compression performed by compressor 330, such that the refrigerant leaves compressor 330 and enters condenser 320 as a superheated, high pressure vapor. The vapor condenses to a liquid at this pressure within condenser 320 and the resultant heat is dissipated to the cooled surroundings. The refrigerant then leaves condenser 320 as a warm, high-pressure liquid. The pressure and temperature of the liquid refrigerant are decreased as the refrigerant flows through an expansion valve 360 and the resultant cool, low pressure liquid is vaporized in evaporator 310 by absorbing heat from the moist inlet air stream. Cooling is accomplished by the evaporation of the liquid refrigerant at low pressure. The refrigerant, as a cool, low pressure vapor, then enters compressor 330 and the cycle is repeated. A water collection device 370 is disposed below, or otherwise in association with, evaporator 310 to collect the condensed water outlet.

As mentioned in the background section above, whenever the surface temperature of evaporator 110 drops below freezing, frost will form on the coil. According to the present invention, this frost is removed periodically through one of three mechanisms (that also could be employed in combination). One of ordinary skill in the art will understand how to apply these mechanisms from the following brief description. The first is a defrost cycle, under which hot gas from the discharge of compressor 130 is recirculated through evaporator 110 until the frost is removed. The second is an electric heater that is integrated in evaporator coil 110 or attached to it or mounted in close proximity, which is periodically operated to melt any frost. The third is an electric heater external to evaporator 110 that radiates heat unto the frost until it is removed. For the latter two options, compressor 130 should be stopped for the defrost mechanism to be the most effective. For the first two methods, the design has to account for the possibility that ice may break off in pieces. Provisions have to be incorporated in the design to prevent these pieces from clogging the drains or drain pans. For example, the drain pan and the drain pipe may have to be heated to avoid any unwanted accumulation of ice. Preferably, when the system is driven through an internal combustion engine, the waste heat available from the engine can also be used as the heat source to defrost the evaporator.

While the above embodiments are based on the usage of a vapor compression system as the source of cooling capacity, whenever waste heat is available, or when only fuel, but no electricity is available, an absorption refrigeration system can be employed instead. Like the vapor compression refrigeration cycle, an absorption refrigeration system produces a cooling effect by circulating a refrigerant through a closed circuit cycle of condensation and evaporation. However, where a mechanical compressor is used in the vapor compression cycle to provide the pressure differentials required to circulate the refrigerant between the evaporator and the condenser, the absorption refrigeration system utilizes an absorption refrigeration generator, a direct heat source, such as a dedicated burner, or an indirect heat source, such as steam, hot water, or waste heat from other processes, and a secondary fluid or absorbent, such as aqueous lithium bromide solution, to circulate the refrigerant. The generator-absorber combination is equivalent to the compressor in the vapor compression refrigeration cycle. Heat applied in the generator causes the mixture of the refrigerant (typically water) and the absorbent to boil, evaporating water while leaving behind the absorbent, thus producing the refrigerant vapor. The refrigerant vapor passes to the condenser where it is condensed into a liquid refrigerant. The liquid refrigerant flows through an expansion valve into the evaporator which operates under a vacuum to absorb heat from the refrigerated space. The resultant refrigerant vapor is then converted back into a liquid before being return to the generator to repeat the cycle. In particular, the lithium bromide solution, which was concentrated within the generator when the refrigerant vapor was boiled off, passes from the generator through a heat recovery heat exchanger to the absorber. The concentrated lithium bromide solution absorbs the refrigerant vapor from the evaporator and is pumped through the heat exchanger, to recover heat from the concentrated solution, before returning to the generator to repeat the process.

In an alternate embodiment of the present invention, a thermoelectric refrigeration system, preferably enhanced by using a counter flow heat exchanger as described above, may be used as the source of cooling capacity. In a thermoelectric refrigeration system, a voltage is supplied to bring about a temperature change across the junction of dissimilar semiconductor materials. A DC power source is provided to pump electrons between the dissimilar semiconductor materials. Applying a DC voltage to a thermoelectric module causes one module face to cool down while the opposite face is heated. A heat sink attached to the hot end of the thermoelectric module discharges the accumulated heat energy from the system. According to the present invention, moist air entering the system passes across the cold face of the thermoelectric refrigeration system, which cools the air below the dew point and produces water.

As an additional mechanism for removing frost from evaporator 110, hot gas leaving the generator of the absorption system can flow directly into evaporator 110. Alternatively, hot solution from the generator or from the absorber can be circulated through evaporator 110 or through a second path that is integrated for this purpose within evaporator 110.

Figure 4:
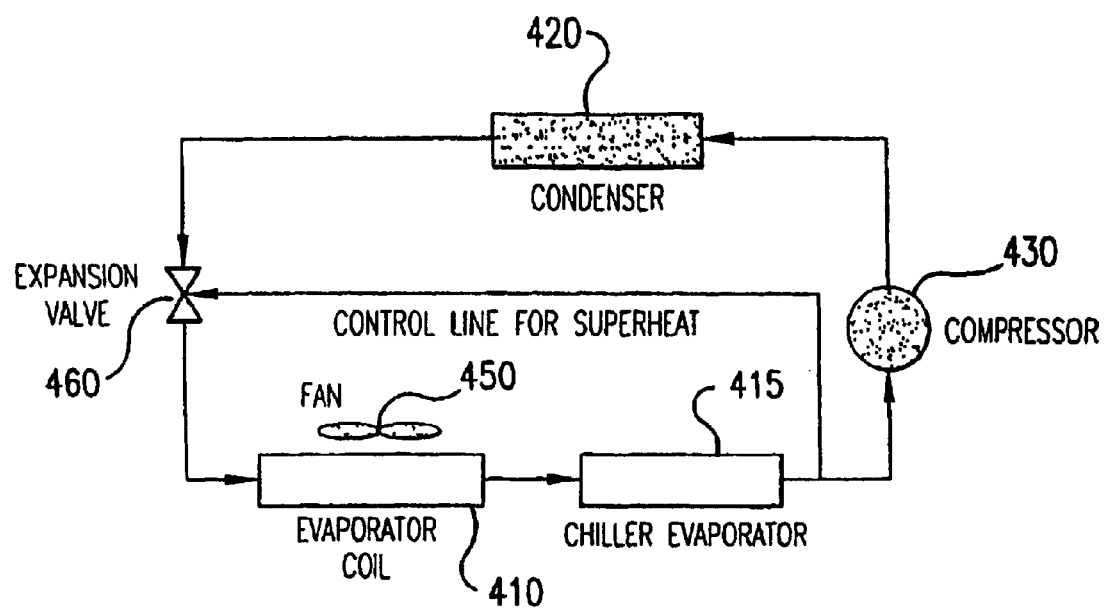
FIG. 4 is a schematic diagram of yet another embodiment of a water maker according to the present invention.
Figure 5:
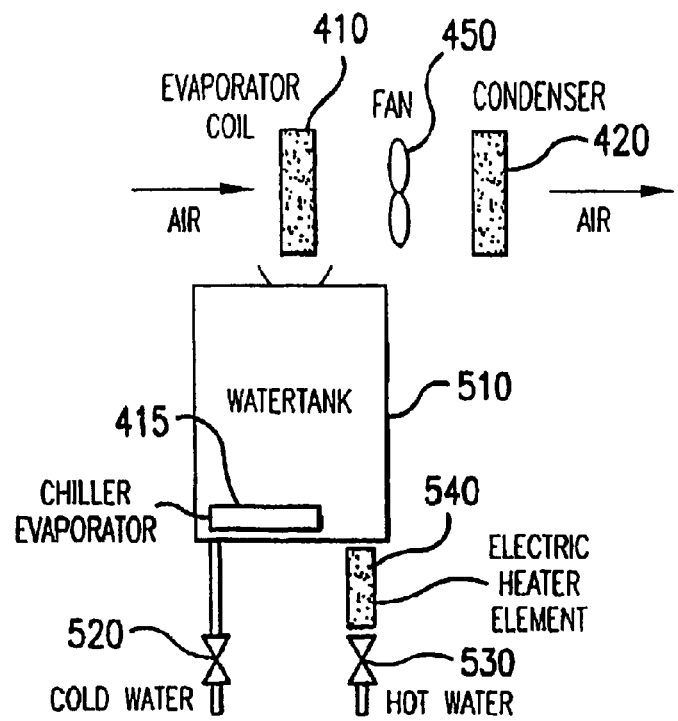
FIG. 5 is a schematic diagram of one embodiment of a complete water making/water cooling unit according to the present invention.
Figure 6:
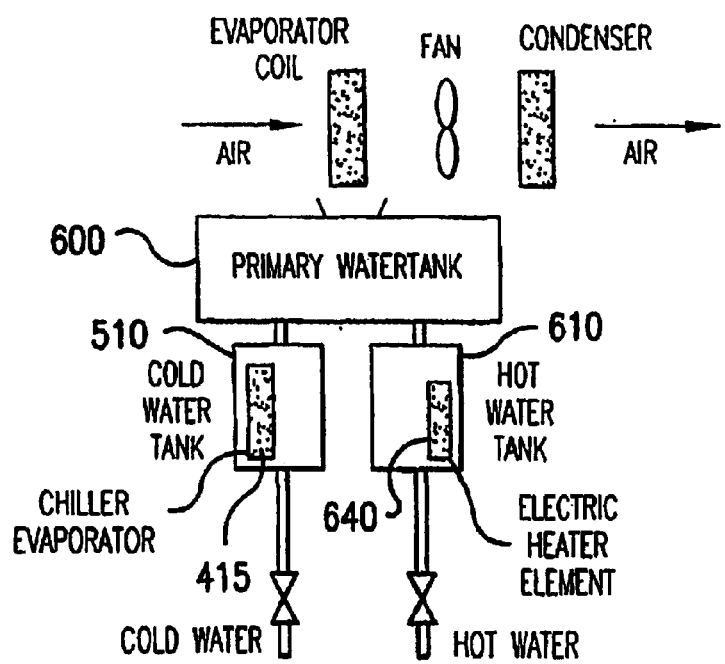
FIG. 6 is a schematic diagram of another embodiment of a complete water making/water cooling unit according to the present invention.

As shown in FIG. 4, in an alternative embodiment of the present invention, two evaporators may be used to provide for a combined water maker and water chiller. The first evaporator 410 serves the same function described above. Air is moved across evaporator 410 by fan or any similar device or just by mere natural convection for the purpose of removing the moisture and producing water. The second evaporator 415 is submerged inside a water storage tank 510, as shown in FIG. 5, or mounted in a heat transfer relationship with a water tank (not shown), such that tank 510 is cooled by second evaporator 415. Tank 510 may be the main water storage device, as shown in FIG. 5, or may serve as a secondary storage device for the mere purpose of producing cold water only, as shown in FIG. 6. When tank 510 is used as a secondary storage device for cold water only, a primary tank 600 serves as the main water storage device and a second secondary tank 610 may be used for the purpose of storing and producing hot water.

Evaporators 410 and 415 are disposed in series, such that second evaporator 415 is located after first evaporator 410 from a refrigerant flow point of view. Alternatively, the reverse order can be used as well. The refrigerant flow for evaporators 410 and 415 is controlled by a thermostatic expansion valve 460 that maintains constant refrigerant superheat at the outlet of second evaporator 415.

The water maker/water cooler system according to the present invention is self regulating and works as follows:

Case 1: Water maker operation is required, but no water cooling is required. The water level control device (not shown) detects that water needs to be made and turns on compressor 430 and fan 450 for air movement across first evaporator 410. Since second evaporator 415 is assumed to have no cooling load and because expansion valve 460 maintains a certain superheat, superheated refrigerant leaves first evaporator 410 and second evaporator 415 serves just as a section of pipe with no heat transfer duty.

Case 2: Water cooling is required, but no water making operation is required. The thermostat (not shown) of water storage tank 510 calls for cooling and turns on compressor 430 only. Again expansion valve 460 causes a constant superheat at the outlet of second evaporator 415, but all the evaporation of refrigerant occurs within second evaporator 415. First evaporator 410 serves just as a section of tube without any or only very minimal heat transfer. Since in this case, fan 450 for first evaporator 410 is turned off, no air is cooled or moisture condensed.

Case 3: Both water making and water cooling operations are required at the same time. The water level control device detects that water needs to be made and the thermostat of water storage tank 510 (FIG. 5) calls for cooling, such that compressor 430 and fan 450 are turned on. Once again expansion valve 460 controls the superheat at the outlet of second evaporator 415. Now evaporators 410 and 415 both transfer heat, and water is made and cooled simultaneously.

The thermostatic expansion valve 460 meters the refrigerant flow such that there is always sufficient liquid refrigerant to fulfill the load requirements, while protecting compressor 430 from liquid flooding. A charge control device (not shown) is preferably employed at the outlet of condenser 420, as a receiver, or at the outlet of second evaporator 415, as a suction accumulator. For better control or to obtain higher capacities, two entirely separate refrigeration systems may be employed, one for water making and one for water chilling. This is, however, the more costly option. In yet another embodiment of the present invention, two evaporators are employed in parallel instead of in series, with appropriately adjusted controls. When the evaporators are arranged in parallel, each one has to be fitted with its own thermostatic expansion valve and a flow control valve. The first maintains the desired superheat at the outlet of the respective evaporator and the second admits refrigerant flow to the respective evaporator depending on whether or not the respective thermostat calls for cooling or not.

FIG. 5 shows a conceptual arrangement of the complete unit.

Condensation dripping off the water maker evaporator coil 410 is collected in water storage tank 510. Here it is kept cold by second evaporator 460. When cold water is needed, it is drained from a cold water valve 520. When hot water is needed it is drained from a hot water valve 530. When hot water valve 530 is operated, it simultaneously operates a switch that turns on a hot water heater 540 that is installed within, at or in close proximity to hot water valve 530, such that cold water in tank 510 is heated instantaneously to the desired temperature.

An alternative version, shown in FIG. 6, allows for one main water storage tank 600 and up to two secondary tanks 510 and 610. The first secondary tank 510 is used for the preparation and storage of cold water. Second evaporator 415 is integrated within tank 510, as discussed above. Second secondary tank 610 is used for hot water, and has an integrated electric heater 640 that maintains a constant hot water temperature. Alternatively, a two tank configuration could be employed where a single secondary tank could either be used for hot water or cold water storage in conjunction with primary water storage tank 600. Depending on available space, control strategy and other design criteria, the above described single tank configuration, two tank configuration, or three tank configuration can be employed.

Water extraction units according to the present invention can be arranged as split units to ensure that customer complaints such as noise are addressed. In one embodiment, the water processing plant itself, including storage tanks, is located in one place (e.g., outside) while the water dispensing unit is located in another space (e.g., inside). By separating the dispensing unit from the water processing plant, the noise generated by the water processing plant can be made inaudible to the customer accessing the dispensing unit. Arranging the water extraction units according to the present invention as split units can also result in a more efficient unit. For example, in another embodiment, the refrigeration system is located outside and the water condensing unit and/or storage and processing are located inside. In this manner, the unit processes hotter and more humid outside air, rather than the dryer, conditioned indoor air.

Another implementation of this device includes in addition, or instead of, the water cooling section, the addition of an ice maker. In this way, the consumer can utilize the clean, fresh water as a source for fresh, clean ice. In contrast to the typical ice maker in a refrigerator, this ice is free of smell and taste and has the same purity as the water. The ice maker can be identical or similar to those used in refrigerator/freezers (although is should have its own evaporator for freezing purposes and should have an expansion device that controls the temperature levels so that ice making is possible); or may be a flake ice maker or other such device as known in the art. Alternatively, when two evaporators are used in series (or parallel) the ice maker function can be integrated using one of these evaporators. When ice is to be made, only the evaporator producing the ice can be in operation (no water can be made) and the thermostatic expansion valve has to be adjusted such that the evaporator temperature is lowered sufficiently (25° F. or lower) to produce ice.

Another feature that can be added to water maker of the present invention are so called proximity valves that cause the water to be dispensed when an object, such as a hand with a water glass, a bottle, or other such container approaches the spout. This can be applied for cold and hot water dispensing and even for the dispensing of ice. The proximity valve may operate based on any of the concepts well known in the art. The preferred option is one in which the water flow is initiated by means of a small dispenser pump dedicated for this purpose. As an alternative, the water pump that is used to manage the water level in the tanks can also perform the duty of dispensing water when appropriate valves are included to direct the water flow as needed.

Another dispenser feature that can be incorporated into the water maker according to the present invention is the "push tube," in which the water dispensing tube itself is pushed in, pulled out and/or bent to cause the water (or ice) to be dispensed.

Another embodiment of the water production unit according to the present invention includes a bottling facility inside the water production unit. For example, the bottling facility may consist of empty bottles inside the machine to be filled up and packaged, or plastic bottles that are inflated before filling. A vending machine may also be provided for sale of the bottled water. Alternatively, the vending machine may allow for the sale of water from the machine into containers that are provided by the customer.

Additionally, for all embodiments discussed above, as an alternative configuration, water filtration and purification devices can be integrated at various points of the water conduits. These can be activated carbon filters or other filters suitable for water purification and UV lights or other such devices to disinfect the water. The filtration system for the water extraction unit can be designed so that the water in the storage tank is circulated on a continuous or intermittent basis by passing the water through the filters and other water treatment devices (e.g., particulate, carbon, UV light, and in some cases the mineral material). A self-cleaning mechanism may also be employed to automatically clean all surfaces that are in contact with the process air or any water containing device. This may be in the form of a carwash type of cleaning system (spray with or without detergent and/or disinfectant) and/or a mechanical brush, sponge or the like that moves to clean the air ducts, water tank surfaces and other surfaces exposed to process air or water. All water contacting surfaces also may be coated with EPA and FDA approved materials that protect from corrosion and biological growth.

Finally, the water-maker according to the present invention may be equipped with a device that prevents the primary storage tank from overflowing while the water maker produces water and no water is consumed. Conventional designs employ a low cost option in which a float is used. When the water level reaches the intended upper limit of the tank capacity the float begins to float on top of the water and a switch, released from the weight of the float turns off the system. This device has the disadvantage that each time the tank is removed to be exchanged for an empty one or for cleaning, the float may not be correctly positioned to act as needed. The following alternative approaches avoid this problem. In one embodiment, a weight sensor may be employed, that measures the weight of the water tank and turns the system off when the prescribed weight is reached. In another embodiment, a differential pressure transducer is used, that measures the static pressure exerted by height of the water column and turns of the system when the prescribed height is reached. In yet another embodiment, an optical device, such as an infrared or light sensing device, may be employed, that measures the height of the water level and, when the light beam is interrupted or reflected by the rising water level, depending of the design, the system is turned off.

While the water maker system according to the present invention produces water that is in purity very similar to distilled water, it is expected that some consumers would like to add minerals to the water to cause it to resemble true spring water or water from a certain ground based source. In other uses, the consumer may want to add syrup, fruit juice concentrate or the like to produce beverages that are based on pure, distilled water. The preferred option to achieve this is to employ a small metering pump that is actuated whenever the dispenser pump is actuated. In this way, the syrup or added fluid or minerals are mixed into the water when it is used and the resulting beverage is always fresh. The metering pump receives its fluid from a storage container that needs to be replaced or refilled periodically. The fact that a metering pump is employed assures that exactly the desired dose of fluid is added. The flow rate produced by the metering pump can be made adjustable so that one device can be used to add minerals at the lowest possible flow rate and syrups or other flavors at higher flow rates as needed.

Figure 7:
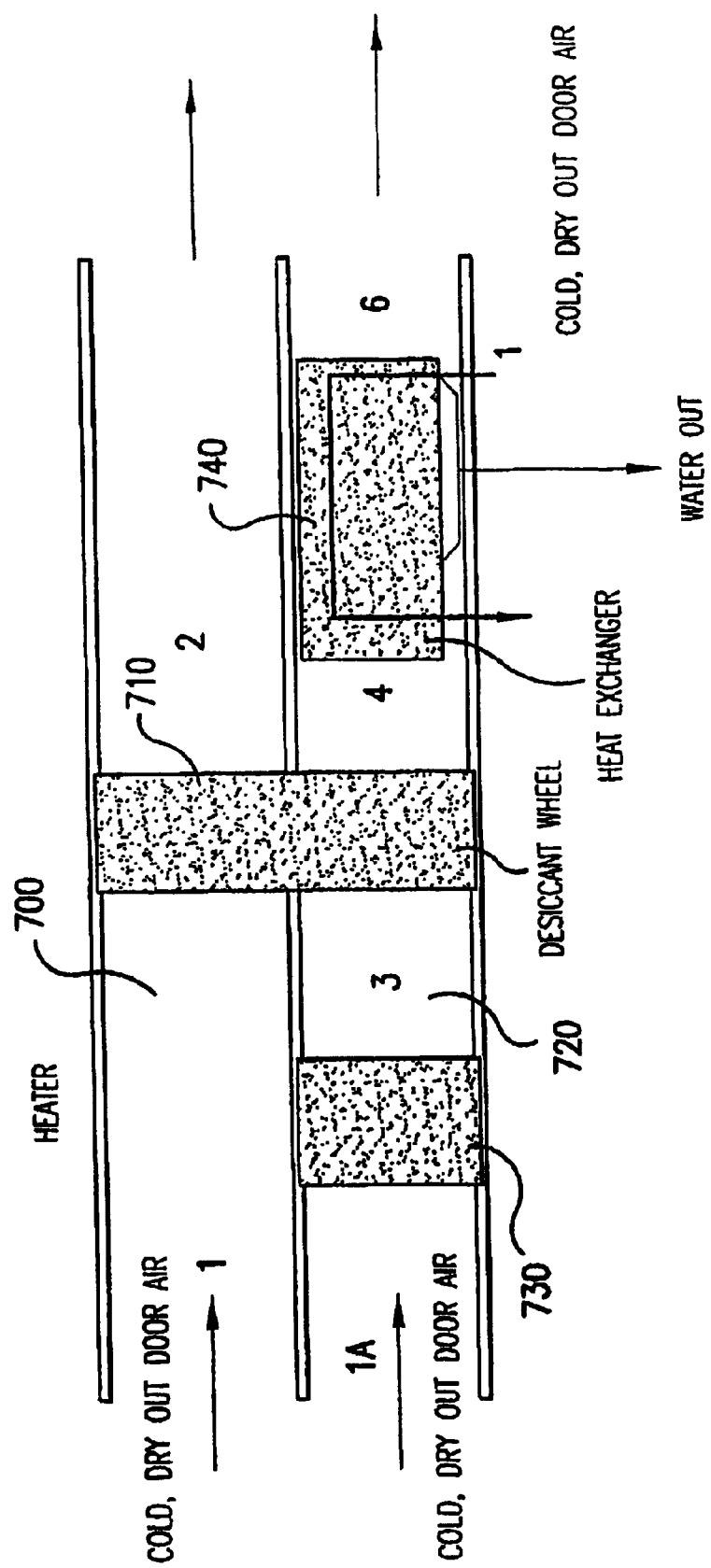
FIG. 7 is a schematic diagram of still yet another embodiment of a water maker according to the present invention.
Figure 8:
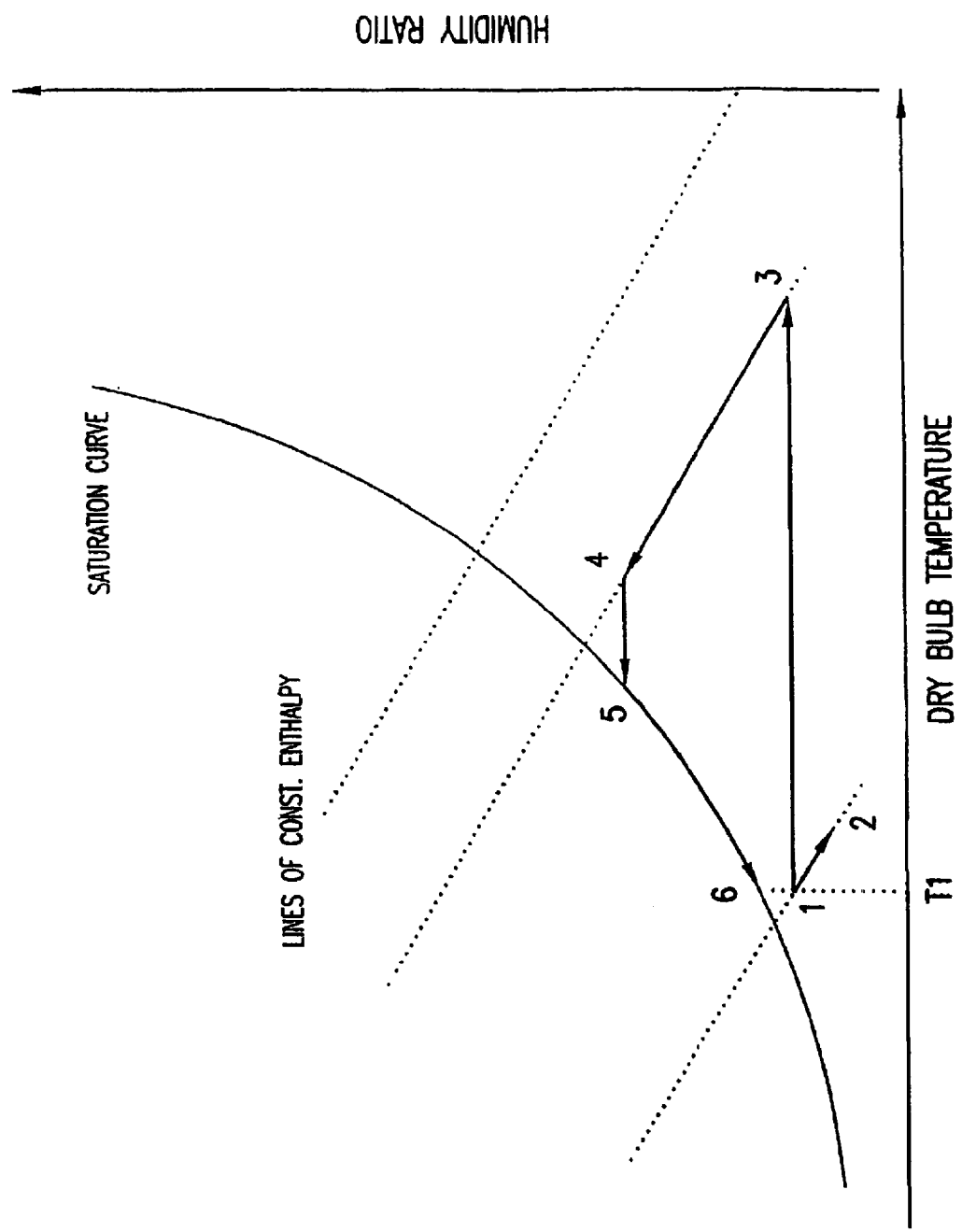
FIG. 8 is a psychometric diagram of the embodiment of the present invention shown in FIG. 7.

In another embodiment of the present invention, a desiccant system may be used to remove moisture from the air, in place of the above described vapor compression and absorption refrigeration systems. Desiccants are materials which attract and hold water vapor. FIG. 7 shows an embodiment of such a system. In this embodiment, relatively dry cold air, too low in temperature to be efficiently processed in a conventional vapor compression or absorption refrigeration design is passed through a first air duct 700 across a desiccant wheel 710, moving from point 1 to 2 (the numbers in FIG. 7 and FIG. 8 refer to the same state points). Desiccant wheel 710 may be any of the various configurations known to those skilled in the art, such as a laminar flow channel desiccant wheel consisting of a matrix of parallel channels, coated or impregnated with the desiccant material, through which air flows. In the process, as the dry cold air flows through first air duct 700, desiccant wheel 710 absorbs the moisture contained in the air and the heat of absorption heats the air stream as well as wheel 710. This process is also shown on the psychometric diagram of FIG. 8.

Desiccant wheel 710 is then rotated into a second air duct 720 where it is exposed to hot air of very small flow rate for regeneration. This hot air stream can originate from either one or both of the following two sources. It can be air from the same source as that of point 1 (as indicated by point 1A in FIG. 7) or it can be air of point 2. As compared to the first option, the latter has the advantage that it is hotter than that of 1, and the disadvantage is that it is dryer. The system designer will select the best option, but the concept works either way. In either case, the air stream in second air duct 720 is heated by heater 730. The flow rate within second air duct 720 is chosen as small as possible, such that the heat supplied by the air to desiccant wheel 710 is just sufficient to heat desiccant wheel 710 to a temperature level of at least 80° C., so that all moisture absorbed by desiccant wheel 710 in first air duct 700 is evaporated into the air stream in second air duct 720. In this way, the moisture content of the warm air stream leaving desiccant wheel 710 at point 4 is much higher than that of the original air stream at point 1 and the dew point of this air stream is also increased considerably. The air stream in second air duct 720 is then passed across an air-to-air heat exchanger 740. The air stream on the other side of heat exchanger 740 is air from the surroundings of the same low temperature as at point 1. Thus, the hot, moist air stream in second air duct 720 is cooled below its dew point (point 5, not shown in FIG. 7), and a significant portion of its moisture content is condensed. Heat exchanger 740 may be cooled through a vapor compression or absorption refrigeration system or by any other cold source. The temperature of the air stream leaving heat exchanger 740 approaches ideally the temperature of the air at point 1. In one embodiment, the energy efficiency of the unit can be enhanced by redirecting the air leaving the evaporator of the refrigeration system in counter flow and heat transfer relationship with the air flowing toward the evaporator, as described above. In order to extract as much moisture as possible from the regeneration air stream, this system can also be operated in conjunction with a vapor compression refrigeration system, as described above, to further remove moisture.

Thus the proposed system uses the absorption properties of desiccant material 710 to extract moisture from a large quantity of rather cold and dry air to create a small stream of warmer, but much moister air. From this warm, moist air stream the moisture can be extracted without any additional source of cooling capacity beyond the original cold air stream. The only energy required to operate this system is the heat required to produce the hot air stream in second air duct 720 for the regeneration of desiccant wheel 710. Heater 730 may be a dedicated burner (not shown) or waste heat from any source that produces heat of a sufficiently high temperature such as truck engines or diesel generators.

Preferred sources include waste heat from a power generation device and solar heat in the form of hot water, steam, hot air or the like. The use of solar heat can be extended, together with the use of a desiccant wheel to generate water from air. In this case, the desiccant wheel is used, possibly in a staged fashion with one or more wheels, to increase the moisture content of a first air stream so much that when this first stream is cooled with a second stream of environmental air, liquid water is formed. Solar energy can also be used with photovoltaic cells to produce power to then operate the water extraction unit. The photovoltaic cells may be integrated with the water extraction unit or be applied as a standalone unit. Large-scale water extraction units may require their own, dedicated power supply or power plant. While the power is used to operate refrigeration cycles for the extraction of moisture, the waste heat from the power supply may be applied in several ways to enhance water production. The waste heat may be used to reactivate a desiccant system as described above. The waste heat may also be used to operate absorption machines to provide additional refrigeration capacity. This capacity may be used to condense moisture outright, in parallel to the vapor compression systems; or to precool the air to facilitate moisture extraction; or to subcool the refrigerant that is then delivered to the evaporator(s) that extract the moisture.

Liquid desiccants, such as a LiCl solution or the like, may also be used according to the present invention. The water can then be reclaimed by using a second, hot air stream that evaporates water from the solution. Then, from such air stream the water is extracted by refrigeration. In an alternative embodiment, reverse osmosis can be used to extract water from the desiccant solution.

In an alternative embodiment of the present invention, $CO_2$ may be used as a refrigerant. $CO_2$ has been found to be an environmentally acceptable refrigerant in conventional refrigeration and heat pumping applications. When $CO_2$ is used, the refrigeration process operates in a transcritical cycle. Thus the compressed vapor does not condense in the condenser, rather heat removal from the condenser occurs by cooling a supercritical fluid, without phase change. This allows for heating of the air that normally would cool a condenser in a conventional refrigeration system to much higher temperatures (about 100° C.) without a significant performance penalty. Such air can be utilized to partially or fully regenerate the desiccant wheel of a water production unit according to the present invention. Thus, by using a $CO_2$ refrigerant, what used to be the waste heat of the refrigeration system, becomes now useful heat to increase moisture concentration in air for easier water extraction.

Figure 9A:
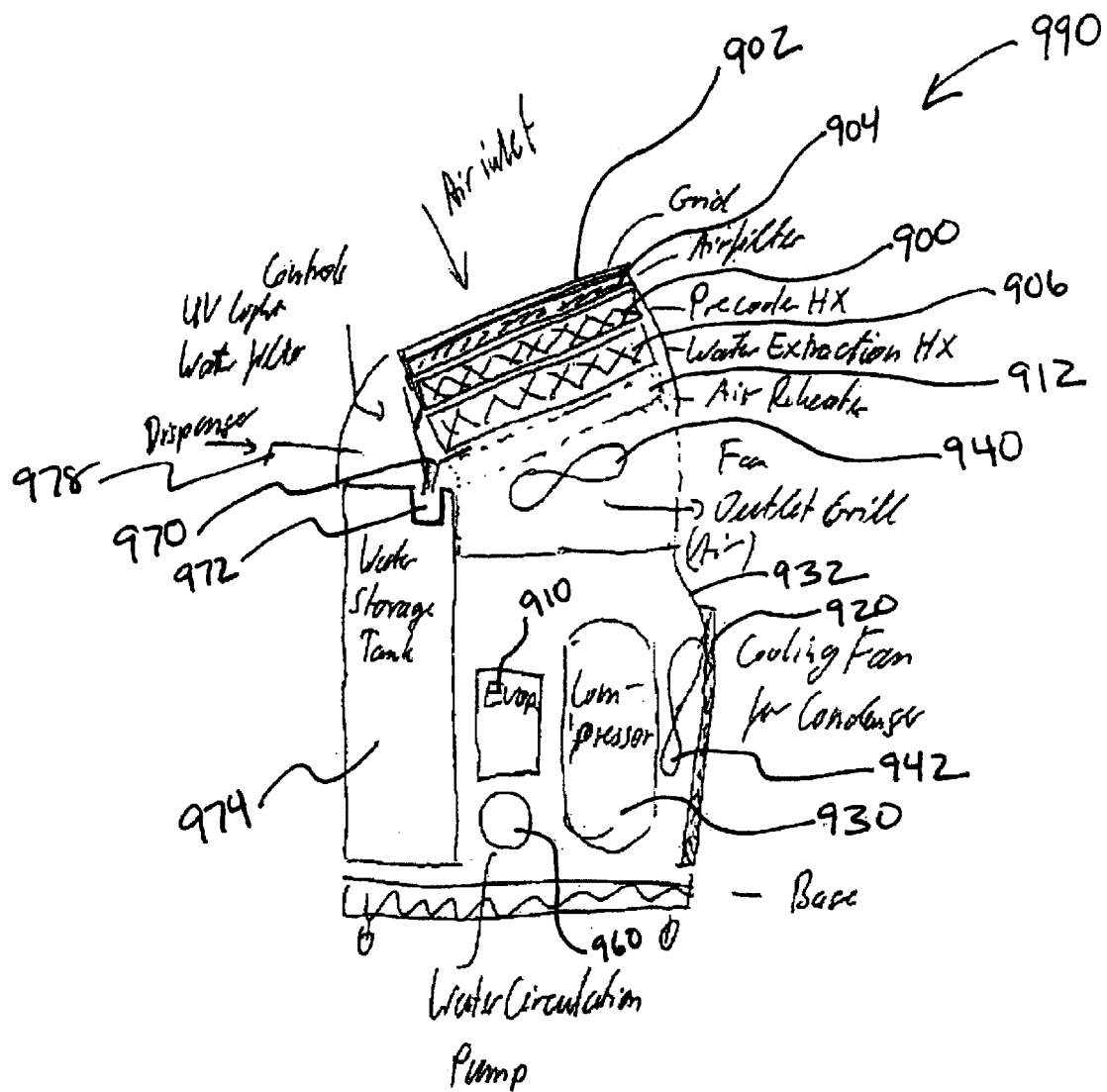
FIG. 9A is a schematic diagram of another embodiment of a water making/water cooling unit according to the present invention.
Figure 9B:
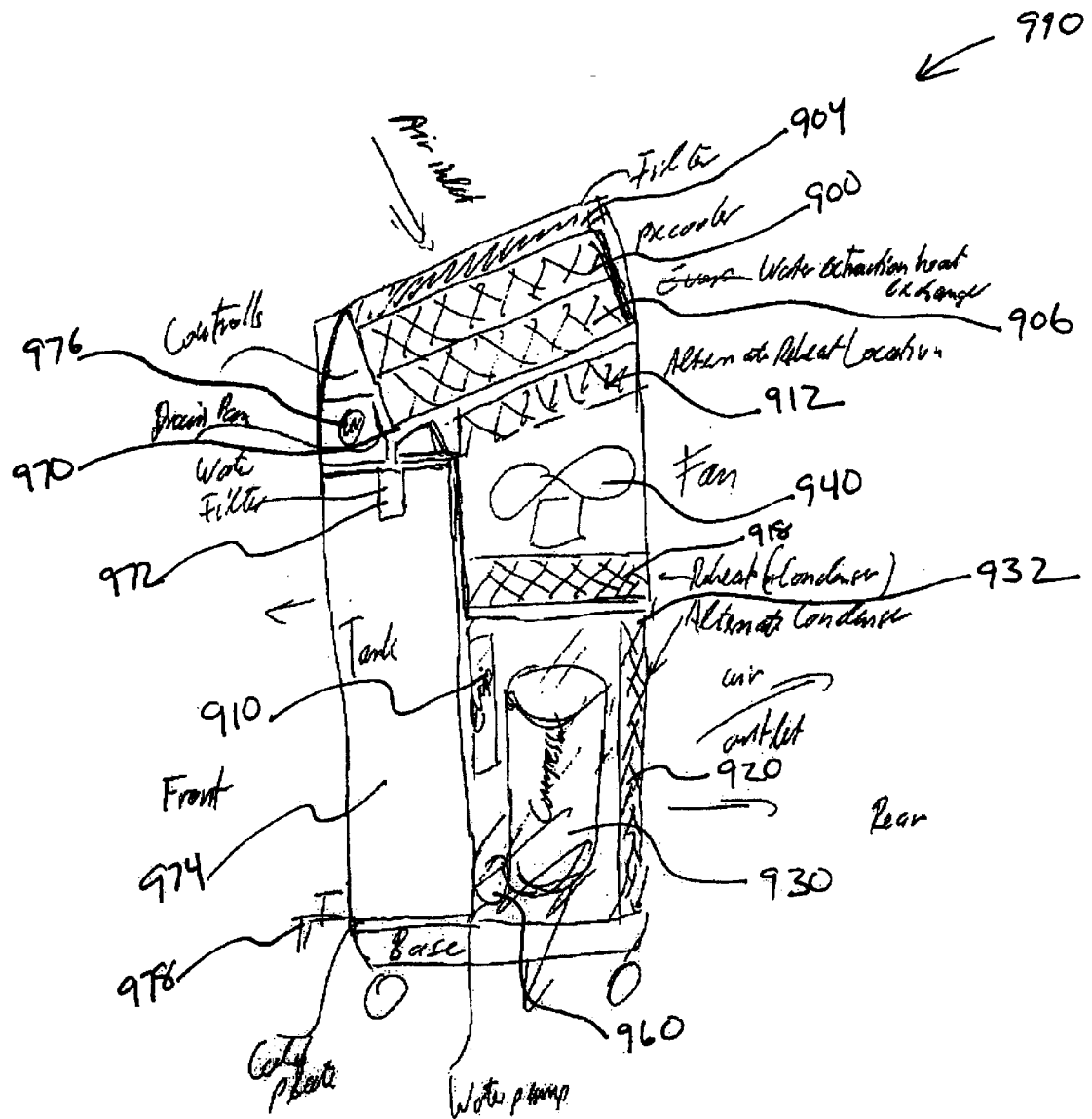
FIG. 9B is a schematic diagram of an alternative embodiment of the water making/water cooling unit of FIG. 9A.

FIGS. 9A and 9B show a further embodiment of the present invention. A challenge encountered with designing a water making/water cooling system is the need for mechanical stability. There are two heavy weight components in such a system, the compressor and the water tank (if filled). Both should be located at low elevations so that the system cannot be tipped over easily. But both components also compete for space. Also, the evaporator typically is located above the highest water level of the unit, in order for the water to flow by gravity into the water storage tank. The present embodiment solves these design problems through the use of a single water circulation pump 960, which serves multiple purposes According to the present embodiment, moist air entering water making/water cooling system 990 flows across an inlet diffuser 902 and then passes across an air filter 904. Preferably inlet diffuser 902 is a grid that mechanically supports and protects air filter 904. The air stream then continues across a precooler heat exchanger 900, where the air stream is cooled to or close to its dew point, and then passes across water extraction heat exchanger 906, where the air stream is cooled further and water extracted. The air stream then passes across a reheat heat exchanger 912, where the air is heated again (as the water on the inside of the heat exchanger cooled), and, finally, the air stream is exhausted to the outside. A cold air fan 940 or similar air flow device establishes the air movement. The water that leaves water extraction heat exchanger 906 is collected in a water collection device 970, such as a drain pan or the like, and passes from there through a primary water filter 972 into the water storage tank 974.

Precooler 900, water extraction heat exchanger 906 and reheat heat exchanger 912 are all mounted in close proximity and could possibly be assembled as one unit as long as means are provided to collect the water at the appropriate location (the coldest heat exchanger). They also can be tilted such that the water flows into water collection device 970 without the need for other mechanisms to facilitate such water collection, however such other mechanisms could be employed.

A compressor compartment 932 houses compressor 930 and four additional components: water circulation pump 960, an air circulation fan 942 that blows air across condenser 920, condenser 920 and evaporator 910 with expansion valve, preferably a thermostatic expansion valve (not shown). Preferably, air circulation fan 942 pulls air through the sidewalls of the compressor compartment 932 over the compressor 930 to cool it and leaves while passing across the condenser 920 of the refrigeration system. In one embodiment, the air inlet can be located in the sidewalls above compressor 930 and the airflow then surrounds compressor 930 and leaves through the lower sidewalls. Condenser 920 can be formed in the sidewall of water making/water cooling unit 990 as shown in FIGS. 9A and 9B or may be integral with reheat heat exchanger 912 as a single unit 918, shown alternatively in FIG. 9B. Further, use of a single fan 940 is also shown in FIG. 9B, wherein the incoming air stream that passes across reheat heat exchanger 912 then passes over compressor 930 to cool it and exits to the outside through the lower sidewalls of the unit while passing across the condenser 920 of the refrigeration system.

Compressor 930 preferably operates according to the vapor compression refrigeration cycle to form a closed loop refrigeration circuit. As discussed above, in the vapor compression refrigeration cycle, a refrigerant is circulated through a closed circuit cycle of condensation and evaporation to produce a cooling effect. The refrigerant, for example Freon gas, first enters compressor 930. The refrigerant temperature is elevated by the mechanical compression performed by compressor 930, such that the refrigerant leaves compressor 930 and enters condenser 920 as a superheated, high pressure vapor. The vapor condenses to a liquid at this pressure within condenser 920 and the resultant heat is dissipated to the cooled surroundings. The refrigerant then leaves condenser 920 as a warm, high-pressure liquid. The pressure and temperature of the liquid refrigerant are decreased as the refrigerant flows through an expansion valve 960, preferably a thermostatic expansion valve, and the resultant cool, low pressure liquid is vaporized in evaporator 910 by absorbing heat from the moist inlet air stream. Cooling is accomplished by the evaporation of the liquid refrigerant at low pressure. The refrigerant, as a cool, low pressure vapor, then enters compressor 930 and the cycle is repeated.

According to the present invention, the two heavy weight components of the system, namely compressor 930 and water storage tank 974 (when filled) are located at low elevations so that the system cannot be tipped over easily.

The system is operated through two fluid circulation loops. The first loop is a refrigeration system as described above. Refrigerant leaves compressor 930 under high pressure and temperature, passes through air-cooler condenser 920 where it is condensed, through expansion device 960 (preferably a thermostatic expansion valve) into evaporator 910, where it evaporates while chilling a water stream from the second fluid loop. The low-pressure refrigerant vapor leaves evaporator 910, being extracted by compressor 930.

Figure 10:
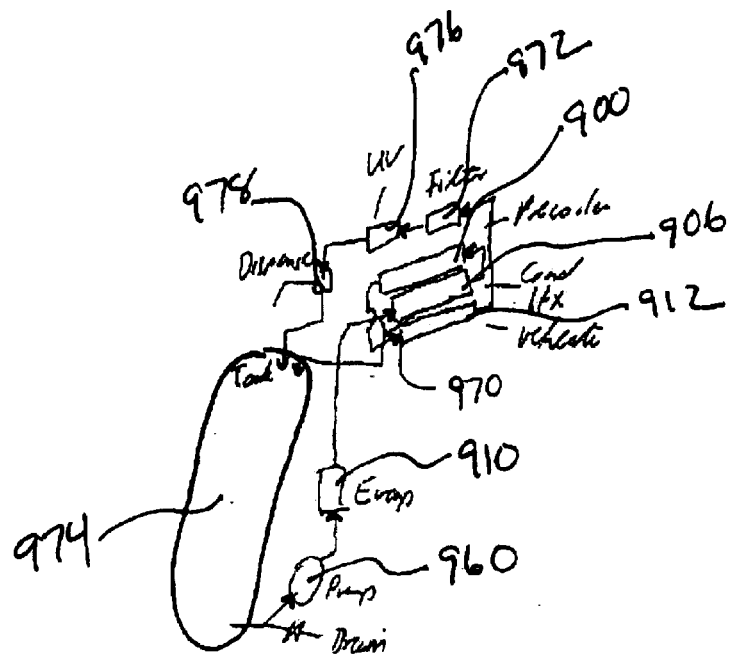
FIG. 10 is a flow diagram of the water circulation circuit of the water making/water cooling units of FIGS. 9A and 9B.

The second fluid circulation loop is a water loop, as shown in FIG. 10. Water circulation pump 960 extracts water from water storage tank 974 and circulates the water stream through evaporator 910, where the water stream is chilled, then through water extraction heat exchanger 906 and precooler 900, where the incoming air stream is chilled by removing heat to the water stream. The water stream is then circulated through reheat heat exchanger 912, where the water stream is again cooled by removing heat to the cool dry air exiting water extraction heat exchanger 906. The cooled water stream is then circulated through water filter 972 and a UV light assembly 976 or other UV flow through device, to further purify and sterilize the water, and finally to a three way valve 968, that directs water flow either to a dispenser 978 or back to water storage tank 974. Preferably, water filter 972 and a UV light assembly 976, as well as air filter 904, are accessible from the top of the unit for ease of service and replacement.

In an alternate embodiment, a single fluid circulation loop can be used, eliminating the need for the first refrigerant loop. In this embodiment, water circulating through evaporator 910 is also utilized as the refrigerant of the refrigeration system. Water circulation pump 960 extracts water from water storage tank 974 and circulates it through evaporator 910, where it also acts as the refrigerant to chill the water stream. The chilled water stream is then circulated through water extraction heat exchanger 906, precooler 900 and reheat heat exchanger 912. The water is then circulated through water filter 972 and a UV light assembly 976 or other UV flow through device, to further purify and sterilize the water, and finally to a three way valve, that directs water flow either to a dispenser 978 or back to water storage tank 974. Since water is also used as the refrigerant in this embodiment, priming the system with water is necessary. For example, the water tank can be prefilled with clean water to provide a minimum water level for the system to begin to operate.

Figure 11:
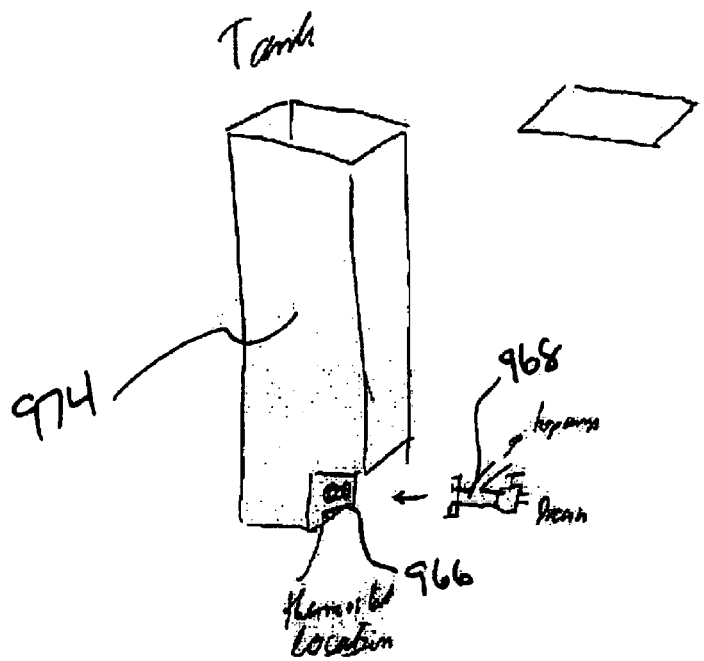
FIG. 11 is a schematic diagram of the water storage tank of the water making/water cooling unit of FIG. 9B.

As shown in FIG. 11, a thermostat 976 is preferably disposed in the water circulation loop or water storage tank 974. Additionally, a water level control switch (not shown) can be provided. Thermostat 976 and water level control switch allow the water maker/water cooler system to be self regulating, as discussed above. If the water level control device detects that water needs to be made and/or thermostat 976 calls for cooling, compressor 930, water circulation pump 960, fan 942 and UV light assembly 976 are turned on. Additionally, when dispenser 978 is activated, water circulation pump 960 and UV light assembly 976 can be activated.

Figure 12:
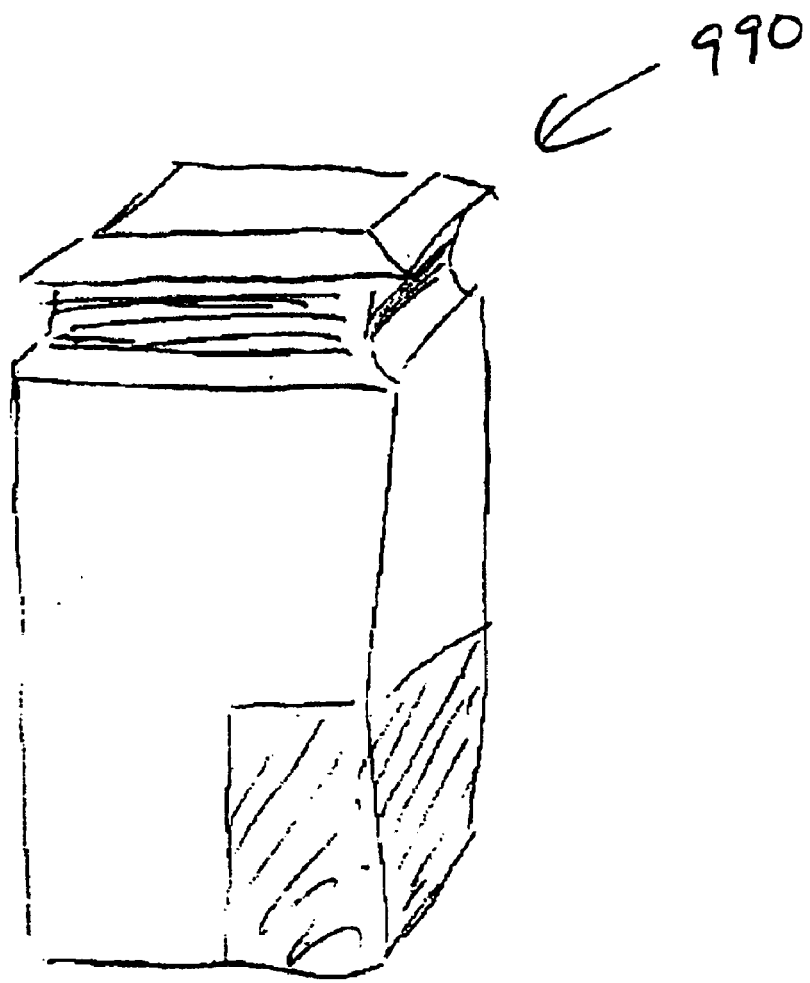
FIG. 12 is an external perspective view of the water making/water cooling unit of FIGS. 9A and 9B.

FIG. 12 is an external perspective view of the water making/water cooling system 990 of FIGS. 9A and 9B.

In the embodiments discussed above, it is suggested that solid surfaces that are chilled below the dew point of the surrounding air, such as heat changers in which a refrigerant evaporates, be used to extract water from the atmosphere. These evaporators are part of a vapor compression or absorption system refrigeration device. By using a heat exchanger, the designer always encounters the challenge of employing a heat transfer with a refrigerant (which has a high heat transfer coefficient) and air that has a notoriously low heat transfer coefficient. Thus a rather high temperature difference between the evaporating refrigerant and the air is required, which represents a loss in efficiency. One way to avoid this loss is to increase the heat exchanger surface area. However, this method encounters severe limitations in this particular application, as the surface area must be limited to ensure that the overall surface temperature remains below the dew point of the air. Accordingly, in an alternate embodiment of the present invention, it is proposed to eliminate the intermediate surface of the heat exchanger between the air and a cooling agent.

In this alternate embodiment, the cooling agent is chilled water that in turn is cooled in a water-to-refrigerant heat exchanger. This heat exchanger has fluids with excellent heat transfer coefficients on both sides of the heat exchanger and can therefore be small. The chilled water must have a temperature that is well below the air dew point temperature.

As with the embodiments described above, moist air entering the system is first precooled. The precooler can be an air-to-air heat exchanger and may consist of a design that includes a heat pipe, a thermo-syphon, a heat exchange wheel or similar devices known to those skilled in the art, as discussed above. However, in this embodiment, this intermediate step has no impact on the energy consumption of the overall system, rather it is done to avoid any unnecessary evaporation of water that then is absorbed again. Precooling the air stream increases the amount of mass transfer that has to be accomplished and therefore limits the surface area available to condense additional moisture from the air stream.

The chilled water cooling agent is then sprayed into the precooled air stream where it cools the air below its dew point and extracts additional moisture from the air stream, leaving the air stream cooler and with a reduced humidity ratio than the incoming air. The air stream contacts the chilled water cooling agent without encountering an intermediate surface and the moisture that is extracted arrives directly in the water stream. Thus, the amount of water returning is larger than that which was injected. Mist eliminators are provided at the air outlet so that no water droplets are carried out of the system. In one embodiment, a duct section of larger cross sectional area is also provided at the air outlet to reduce air velocity.

According to this alternate embodiment of the present invention numerous advantages are realized. As would be apparent to one of ordinary skill in the art, the evaporator can be reduced in size. Additionally, while conventional evaporators, due to their large extended surfaces, are hard to clean or expose uniformly to UV light or any other disinfectant, eliminating the intermediate surface of the heat exchanger between the air and a cooling agent according to the present embodiment reduces potential health hazards. The air stream contacts the chilled water cooling agent without encountering an intermediate surface and the moisture that is extracted arrives directly in the water stream. The resultant water stream can be treated by UV light, processed in filters and treated in any other way desired. No surface cleaning is necessary, other than cleaning of the unit housing. Additionally, only the water stream needs to be processed, the air stream does not have to be extensively filtered.

A water circulation pump is used to generate the chilled water spray. While this is an additional piece of equipment and cost, the water circulation pump can serve multiple purposes, for example, transferring the extracted water into a holding tank, dispensing the water, circulating the water for filtering and UV processing, and/or circulating the water through the evaporator for the purposes of maintaining chilled water in the tank. Additionally, to start up the system, the water tank is prefilled with clean water to provide a minimum water level for the circulation pump and spray chamber to begin to operate.

In a further alternate embodiment of the present invention, a Maisotsenko Cycle, as is known in the art, can be reversed to extract water from air. Two inlet air streams are required. The first is as hot and as humid as possible and the second is as cold and humid as possible. Bringing both streams into a heat and mass transfer relationship in a staged fashion will produce water and a single air stream that is dry. The cold air stream can be generated by passing air over the evaporator of a conventional water extraction system, as described above.

In a further embodiment of the present invention, a membrane is used to separate water molecules from the incoming air stream. The water vapor in the atmospheric air will filter through the membrane into a evacuated tank. The tank contains a cooled surface that condenses the water and the resulting condensed water is pumped out. The advantage of this approach is that the device that condenses the water vapor does not also have to cool the air as is done by the conventional water extraction unit.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A device for collecting water from air, comprising:
    a housing, wherein a bottom of said housing comprises a first compartment and a second compartment;
    a precooler heat exchanger, disposed within said housing that receives an air stream, wherein said air stream is cooled close to its dew point by said precooler heat exchanger;
    a water extraction heat exchanger, disposed within said housing adjacent said precooler heat exchanger, wherein said water extraction heat exchanger further cools said air stream and extracts water therefrom;
    a condensed water collection device, disposed adjacent to said water extraction heat exchanger that collects said extracted water;
    a water storage tank, disposed in said first compartment of said housing, wherein said water is directed by said condensed water collection device into said water storage tank;
    a reheat heat exchanger, disposed within said housing adjacent to said water extraction heat exchanger, wherein said air stream is heated by said reheat heat exchanger;
    an exhaust outlet in said housing that permits said air stream to exit said housing;
    a fan disposed within said housing that establishes the flow of said air stream into said housing through said precooler heat exchanger and out of said housing through said exhaust outlet;
    a closed loop refrigerant circuit connecting a condenser and an evaporator through which a refrigerant flows from said condenser through an expansion valve to said evaporator and from said evaporator through a compressor into said condenser, wherein said closed looped refrigerant circuit is disposed in said second compartment of said housing; and
    a closed loop water circulation circuit through which a water stream is extracted from said water storage tank by a water circulation pump and flows to said evaporator, wherein said water stream is chilled, and said water stream flows from said evaporator through said water extraction heat exchanger, said precooler heat exchanger, and said reheat heat exchanger, to said water storage tank.

* * * * *